Patented June 4, 1946

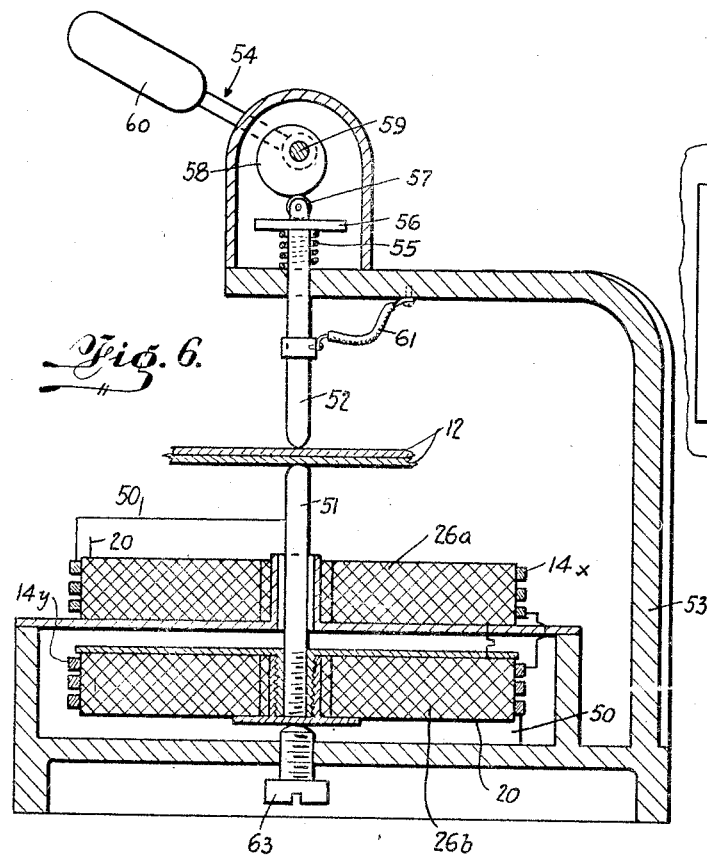
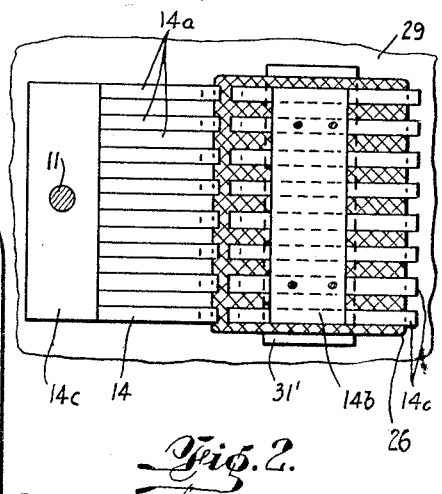
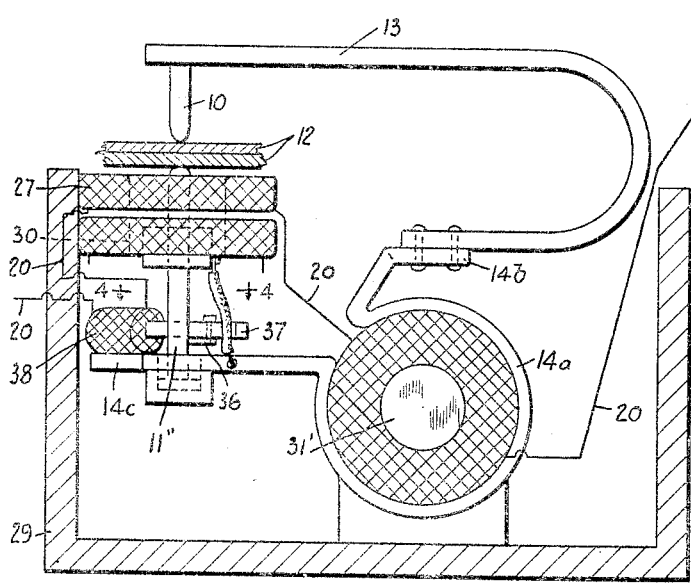
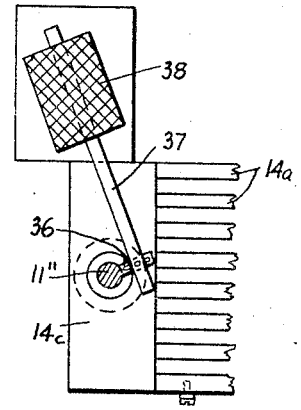

2,401,528

UNITED STATES PATENT OFFICE 2,401,528

RESISTANCE WELDING

Alfred Vang, New York, N. Y., assignor, by direct and mesne assignments, to Continental Can Company, Inc., New York, N. Y., a corporation of New York Application January 20, 1944, Serial No. 518,918

4 Claims. (Cl. 219—4)

This invention relates to new and useful improvements in resistance welding, and more particularly, it relates to improvements in my high frequency welding process disclosed in my Patent No. 2,287,544, issued June 23, 1942.

In recent years great strides have been made in the development of welding methods and equipment. In fact, this field is progressing so rapidly that in a short time the use of other methods, such as riveting, soldering, brazing and the like, for joining metals will be materially reduced, and perhaps totally eliminated upon a great many objects and in many fields.

The high frequency method disclosed in my patent, supra, was an important step forward in welding. However, I have developed numerous improvements on this method, which have great advantages. Before considering some of these advantages, it may be well to understand the fundamental features of this invention.

Essentially, the improved method for welding distinguishes from my prior method in that it is now proposed to apply a mobile physical pressure, in addition to the initial pressure, to press the electrodes against the work pieces. It is proposed to synchronize, in certain ways, this additional mobile physical pressure in relation to the electric surges of the welding current. The invention is particularly intended to be used with a welding system using a condenser stored current, which is discharged to perform the welding.

The additional mobile physical pressure may be applied and incorporated with the new welding system in any number of ways, each of which has some advantage for a particular welding job. For example, it is proposed that the additional mobile physical pressure be controlled as to its duration (a) to exceed the discharge of the welding current, (b) to be less than the duration of the condenser discharged welding current, (c) to lag the condenser discharged welding current, (d) to lead the condenser discharged welding current, or (e) to be exactly equal to the condenser discharged welding current, etc.

Furthermore, it is proposed to characterize said additional mobile physical pressure as to the way in which it is obtained, as for example (a) by converting a part of the electric impulses of the condenser discharged welding current, (b) by utilizing more than one condenser discharge and converting part of the electric impulses electromagnetically, (c) by using an auxiliary electric current and electro-magnetically converting the same or part of same, etc.

The distinction between the new mobile physical pressure proposed to be used by this invention and the regular initial static or stationary pressure heretofore used, should be clearly recognized. In prior welding systems it is customary to apply large pressures on the welding electrodes to define the electric path. With my high voltage high frequency system disclosed in my patent, supra, it was possible to obtain very good welds with very much less initial pressure on the electrodes. This had numerous advantages pointed out in the patent specification. However, in my prior patent, I did just what everyone else was doing in applying only initial pressure to the welding electrodes. I have discovered that a great many advantages are gained by applying a mobile physical pressure in addition to the initial pressures generally used. In the first place, the wear and tear on the electrodes themselves is materially reduced. The electrodes will not deteriorate as rapidly and will maintain their shapes and other required qualities for a longer period of time. The control between the work pieces and the electrodes may easily be maintained to avoid various objectionable features heretofore inherent in applying all the pressure needed for a welding operation initially to the electrodes.

In accordance with this invention, the initial pressure may be less than required to weld, and yet at the instant or instants of welding, a sufficient pressure for performing the weld will be had, because of the additional mobile pressure. Furthermore, the additional mobile physical pressure greatly assists in defining the path for the welding current, so that it will not be divided and flow through prior welds.

With the improved welding method of this invention, it will be found that metals easy to weld may be welded with greater ease, and that metals difficult to weld may be welded with comparative ease. There will be less distortion, less discoloration, and less crystallization at the welded areas. The new method is inherently stable with regard to both power consumption and power supply. One of the reasons why the spot welds will be consistently reliable as to strength and other physical characteristics is because the indentations in the work pieces produced by the electrodes will be small, or even non-existent. Large indentations are known to weaken the weld. The indentations will be smaller because the initial pressure is smaller, and at the instant of weld, when a greater pressure is required, it is there, but the next instant when the work pieces are still soft at the welded point the pressure will no longer be exerted and, therefore, the tendency for the electrodes to indent themselves in the work pieces will be materially reduced.

Moreover, with the instant system the efficiency of the welding operation is so increased by the fine manner in which the welding current is controlled and directed, that the work pieces will not heat up to such a degree at points externally to the weld points, as with prior systems and, therefore, will not soften as much and will be better capable of holding the electrodes from forming indentations.

Still further, because of the more efficient path for the flow of the welding current, it is not necessary, as is now common practice, to use strong or relatively strong pressures on the welding electrodes to eliminate completely or nearly completely, the air gaps and other dielectric films between the work pieces.

Another important advantage of this invention resides in the fact that the bulk or mass of the welding apparatus will be reduced. This necessarily reduces the cost of equipment and increases its convenience of use, particularly where space is a factor. With the present invention it is possible to construct a welding machine which may be built at considerably lower cost and be of much less weight than heretofore.

With the above and other objects in view, this invention consists of the novel features of construction, combination, and arrangements of parts, hereinafter fully described, claimed and illustrated in the accompanying drawings, forming part of this application, and in which similar characters of reference indicate corresponding parts in all views, and in which:

Figure 2 is a horizontal sectional view taken on the line 2—2 of Figure 1.

Figure 3 is a sectional view similar to a portion of Figure 1, but illustrating a modified form of the invention.

Figure 4 is a fragmentary horizontal sectional view taken on the line 4—4 of Figure 3.

Figure 6 is a fragmentary sectional view of still another means for welding, constructed in accordance with still another form of this invention.

Figure 1:
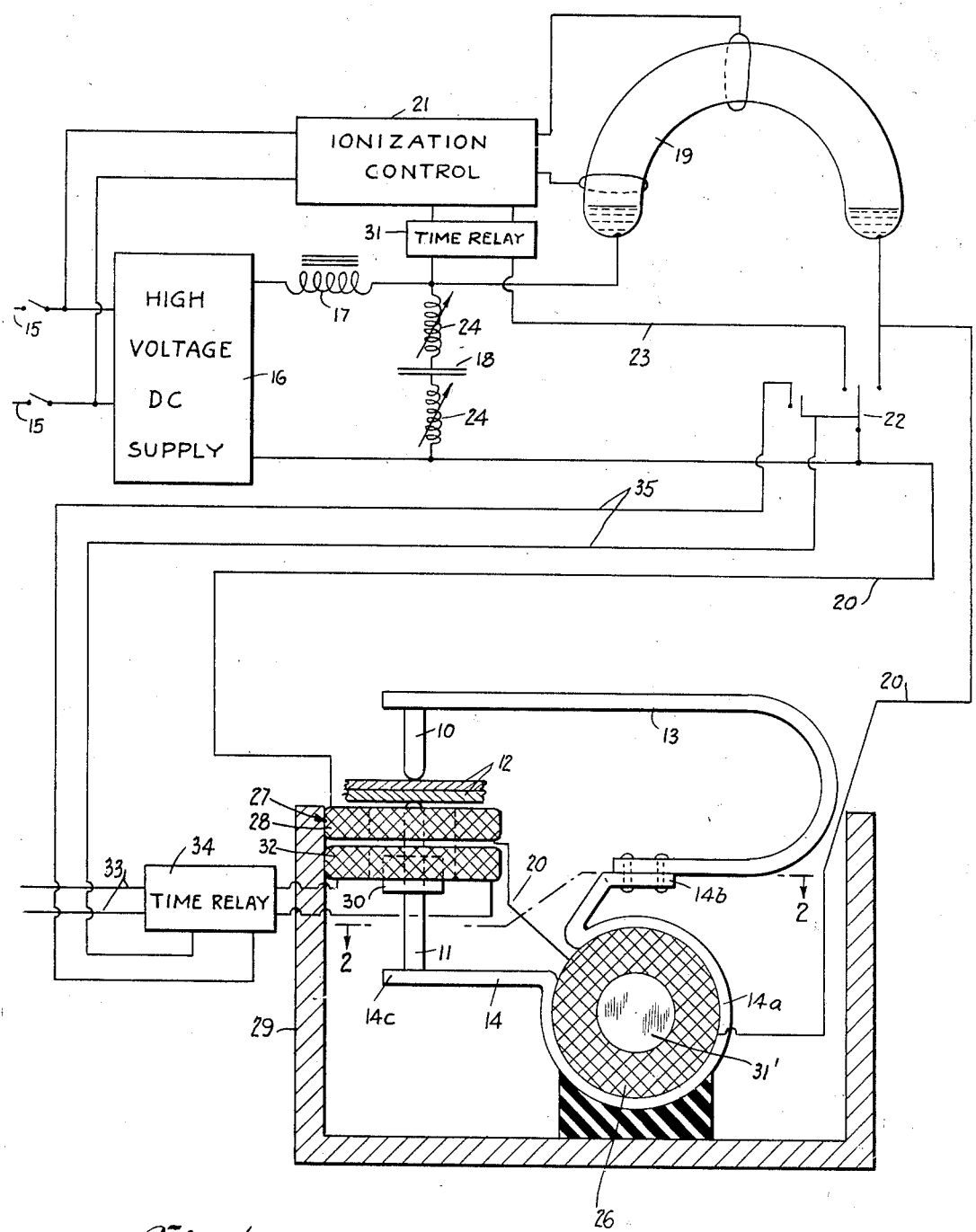
Figure 1 is a schematic sectional view of means for welding, in accordance with this invention.

The means for carrying out the improved method of resistance welding, in accordance with this invention, as disclosed in that form of the invention illustrated in Figures 1 and 2, includes a pair of opposed spot welding electrodes 10 and 11. These electrodes are associated with pressure means by which they may be urged against the work pieces 12 positioned between them. The particular pressure means includes a clamp-like spring 13 which supports one of the electrodes, namely, the electrode 10, and which is connected with a clamp-like member 14, which supports the electrode 11. It should be understood that this particular pressure means is illustrative, and that other types and designs may be used.

A system for discharging a high or low voltage, high frequency welding current is connected up with said electrodes 10, 11. This system is very similar to my electric welding system disclosed in my Patent No. 2,287,544. Power from commercial supply lines 15 is translated to high voltage direct current by conventional means, which may be represented by the supply unit 16, and is permitted to flow through a choke coil 17 into a relatively large capacitor 18, which by this means accumulates a charge of electrical energy sufficient for performing the weld. The accumulated charge may be discharged at will by means of a discharge tube 19 of a design covered by my Patent No. 2,287,541, issued on June 23, 1942, through a high frequency discharge circuit 20, which is indirectly connected with the electrodes 10 and 11. The discharge tube 19 is controlled by ionization control apparatus 21, operated by a switch 22 controlling the ionization control circuit 23.

The switch 22 is of the double throw type, and is also used to shunt the capacitor 18 as a protective device to minimize danger of shock to the operator. Inductances 24, such as variable high frequency reactors, are connected in the circuit of the capacitor 18 for controlling the impedance of the capacitor, to control the welding discharge current. Up to this point the present invention does not materially differ from that disclosed in my patent, supra. The apparatus and method now departs from my previous disclosure in the utilization of a transformer of special design connected with the discharge circuit 20 and associated with means for converting part of the electric impulses into a mobile physical pressure at the electrodes. More specifically, said transformer includes a primary winding 26, preferably of honeycomb design or basket weave design, or a banked winding, or other arrangement to reduce capacitance. The secondary for this transformer is in the nature of one turn (or a relatively small number of turns) of conductors 14a connected in parallel between terminal plates 14b and 14c. These conductors 14a are also used as a part of the clamp-like member 14 previously referred to. The conductors 14a are shown to partially surround the primary winding 26. The terminal 14b is used as a support for the clamp-like spring 13. The terminal 14c is used as a support for the electrode 11. With this arrangement, low voltage high frequency current will be induced between the electrodes 10 and 11 when a high voltage high frequency current flows through the primary 26.

The means for converting part of the electric impulses of said welding discharge current into mobile pressure instantaneously applied to press the electrodes 10 and 11 against said work pieces 12 for assisting in establishing the intended path for the welding current, includes electro-magnetic means connected in series with said primary winding 26. This electro-magnetic means comprises a solenoid 27, having a coil 28 supported on a housing 29, and having an armature 30, which is fixedly mounted on the electrode 11. This armature 30 may be solid or may be in the nature of an electric winding generally known by those having knowledge of solenoid actions. A metallic core 31' is located within the primary coil 26.

The ionization control circuit 23 is itself controlled by a time relay 31, which may be set to cause the ionization control 21 to function a fraction of a second, or any selected time, after the control switch 22 closes the ionization circuit 23. An auxiliary coil 32 is associated with the core 30 of the solenoid 27 and comprises a portion of auxiliary means for supplying the mobile physical additional pressure. This coil 32 is in a circuit 33, controlled by a time relay 34, which is actuated by a circuit 35, controlled with the switch 22. The time relay 34 is of a nature to control the passage of current from the circuit 33 through the coil 32 for a selected time interval, and synchronized with the discharge of the welding current.

The operation of the device is substantially as follows:

When the apparatus is not being used, the switch 22 is closed towards the right to shunt the charge, which may still remain upon the capacitor 18, from reaching the electrodes. This is merely a safety measure to prevent danger of shock. To perform a weld, the switch 22 is moved to the left to close the ionization control circuit 23 and the auxiliary pressure circuit 35. When the control switch 22 is closed to the left, the time relays 31 and 34 are set into operation. An important feature of the invention resides in the fact that these relays may be synchronized in relation to each other to operate simultaneously, or for one to operate before or after the other, depending merely upon a particular design of apparatus and a particular job for which the apparatus is to be used.

The time relay 31, after the selected time interval, will close the ionization circuit 23, setting the ionization control 21 into operation. The stored electric charge on the capacitor 18 will be discharged through the discharge tube 19 and through the discharge circuit 20, which, it should be noted, includes in series the said primary winding 26 and the coil 28 of the solenoid 27. The current in the circuit 20 preferably will be a high voltage, high frequency current. However, the transformer, comprising primary 26 and secondary 14, will transform this current so that a high frequency low voltage current will be supplied to the electrodes 10 and 11. It is pointed out that each electric impulse which performs the welding at the electrodes 10 and 11 will be simultaneously communicated to the solenoid 27 to impress an additional mobile physical pressure on the electrodes 10 and 11. This pressure is in addition to the initial set pressure of the electrodes obtained by the clamp spring 13, or by other means.

The time relay 34 may be set to function before the relay 31, or simultaneously with the relay 31, or subsequently to said relay, as already stated. When the time relay 34 does function, the circuit 33 will energize the coil 32, which will act on the armature 30 of the solenoid 27 to supply an additional physical pressure to the electrodes 10 and 11. It is pointed out that this additional pressure may be applied an instant before the discharge of the welding current, or simultaneously with the discharge, or for any selected period after the discharge. These electro-magnetic controls of the pressure, produce the fine control previously referred to, which makes it possible to perform a superior weld. The additional mobile physical pressure assists in establishing the intended path for the welding current through the work pieces 12 and, furthermore, is so controlled and applied as to reduce to a minimum the indentations of the electrodes upon the work. The heat of the weld is also kept low, which reduces crystallization, etc. It will be noted that the apparatus is very simple of construction and made of parts of little mass or weight, thus permitting the construction of a light weight welding machine.

In Figures 3 and 4 a modified form of the invention is disclosed, which is similar to the prior form, distinguishing in the fact that the character of the mobile pressure has been somewhat altered. In accordance with this form, the mobile pressure not only is longitudinally of the electrodes 10 and 11, but it is also rotary. The electrode 11" is turnably supported in a terminal 14c. A radial pin 36 projects from the electrode 11" and connects with a core 37 of a solenoid 38. The solenoid 38 is connected in series with the circuit 20. In this form of the invention the solenoid 27 with its armature 30 is also used.

When the surges of high voltage, high frequency current pass through the circuit 20, part of the impulses will be translated by the solenoid 27, 30 to instantaneously apply an additional mobile pressure on the electrodes 11" and 10, and simultaneously the solenoid 38 will operate to slightly twist the electrode 11" to instantaneously impart a twist to said electrode to vary the character of the additional mobile pressure. The combined additional pressure and the twisting action will be transferred to the molecules of the work pieces 12, causing them to rearrange themselves, and this action assists in establishing the intended path for the welding current. This construction reduces the amount of initial pressure required, as well as increasing the efficiency of operation of the welding apparatus, which makes it possible to perform welds with smaller and lighter equipment.

Figure 5:
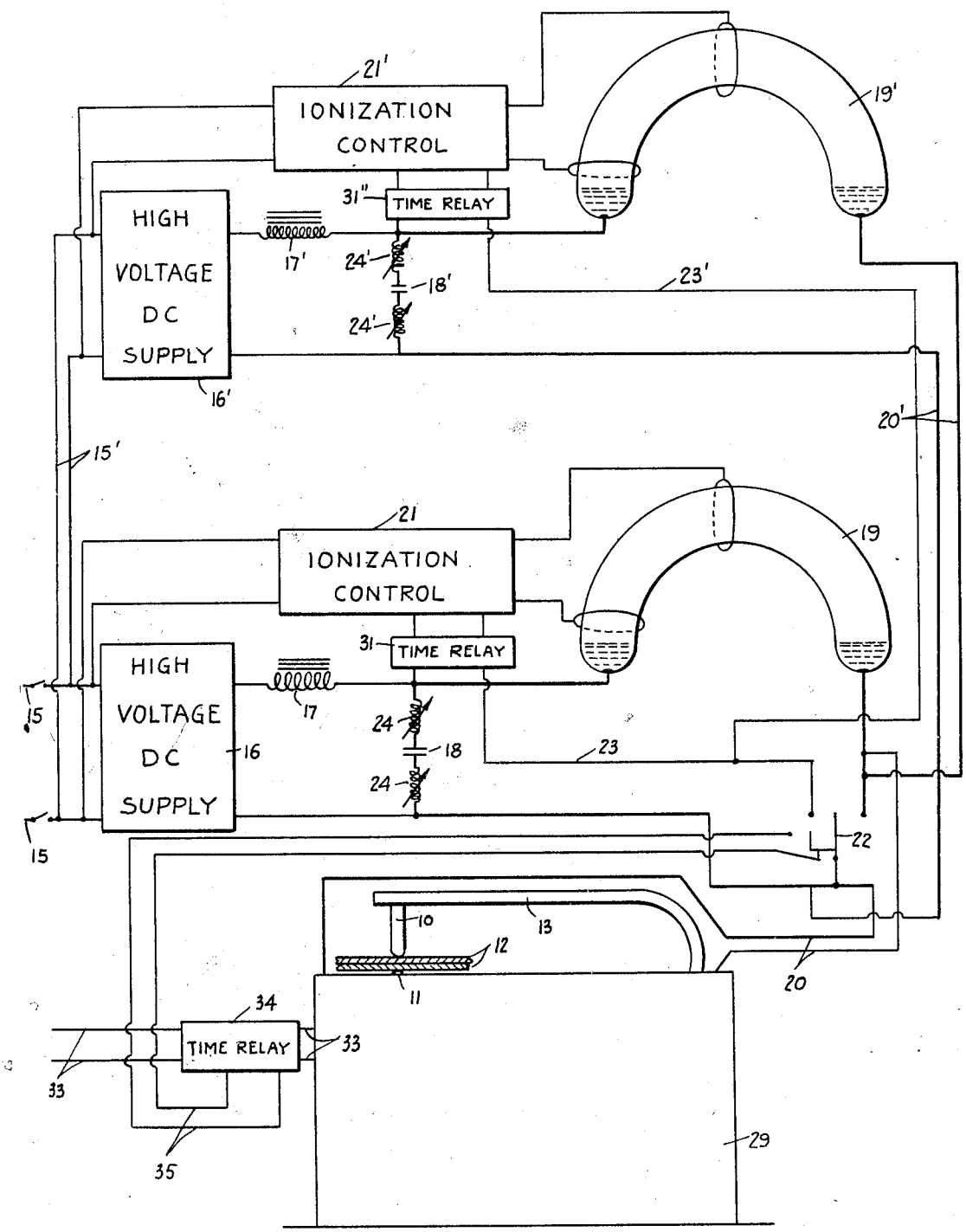
Figure 5 is another schematic view of means for welding, but constructed in accordance with another form of this invention.

In Figure 5 still another form of the invention has been disclosed which distinguishes from the first form of the invention, in the fact that two discharge tubes and associated controls are used. More specifically, in addition to the electric discharge tube 19, there is a discharge tube 19' controlled by an ionization control 21', which in turn is controlled by a time relay 31". The discharge tube 19' receives its current from a capacitor 18' in circuit with the inductances 24'. The current is supplied from a circuit 15', operating a high voltage D. C. supply 16', which is connected up with the capacitor 18'. This circuit includes a choke 17'. The time relay 31" is controlled by an ionization control circuit 23', which is connected up with the circuit 23. The discharge circuit 20' from the discharge tube 19' is connected up with the circuit 20.

In other respects this form of the invention is similar to the prior form and like parts are identified by similar reference numerals.

The operation of this form of the invention is identical to the first form, distinguishing merely in the fact that when the switch 22 is closed to discharge the welding current, the circuit 23' will be simultaneously closed, and the time relay 31" will control the discharge of an auxiliary current through the tube 19'. This auxiliary current may be in the nature of an auxiliary welding current, or may only be in the nature of a current for supplying auxiliary mobile physical pressures to said electrodes. Because of the time relays 31" and 31, the auxiliary current and auxiliary pressure may be regulated or synchronized so that it occurs prior to, or simultaneously with, or subsequent to the discharge of the welding current through the discharge tube 19. This improved device operates substantially identical to the prior form, distinguishing in that the flexibility of control of the mobile pressure is increased.

In Figure 6 still another form of the invention has been disclosed, which distinguishes from the prior forms, essentially in the fact that the transformer which is used to transform the high frequency, high voltage current to the high frequency, low voltage welding current is used as well to electro-magnetically supply the additional mobile physical pressure. More specifically, the transformer has a primary coil formed of two sections 26a and 26b which may be connected up in series or in parallel. This primary is connected in the circuit 20. The transformer has a secondary 14x and 14y encircling the primary, and connected in parallel or in series. This secondary is connected in a circuit 50, which includes the electrodes 51 and 52.

The electrode 51 is fixedly mounted upon the primary 26b and slidably passes through the center of the primary 26a, and is fixedly mounted on a frame 53. The electrode 52 is slidably mounted upon the frame 53 and is associated with a manual cam operated pressing means 54 by which the electrode 52 may be manually pressed down. A spring 55 normally urges the electrode 52 upwards. This spring 55 acts against a collar 56 mounted on said electrode. The collar 56 carries a roller 57, engaging a cam 58 fixedly secured on a shaft 59, to which a handle 60 is connected. A cable 61 is connected between the electrode 52 and frame 53 for insuring a good electrical connection. The work pieces 12 are shown between said electrodes. An adjustment screw 63 is mounted on the bottom of the frame 53 and is for the purpose of supporting the electrode 51 in selected positions.

When the discharged current passes through the circuit 20, the coils 26a and 26b will be attracted towards each other. Since the coil 26a is fixedly mounted and the coil 26b is mounted on the electrode 51 which is movable, the electric impulses in the circuit 20 will be partially converted to produce a mobile physical pressure between the electrodes 51 and 52. The electric impulses in the circuit 20 will be transformed by the transformer, so that a high frequency, low voltage welding current is induced in the secondaries 14x and 14y, and thus in the welding circuit 50.

It is obvious that slight changes may be made in the form, construction and arrangement of the several parts, as shown, within the scope of the appended claims, without departing from the spirit of my invention, and I do not, therefore, wish to limit myself to the exact construction and arrangement shown and described herein.

Having thus described my invention, what I claim as new and desire to secure by Letters Patent of the United States is:

1. A welding device comprising a transformer, having primary and secondary windings, two opposed electrodes adapted to receive work pieces therebetween, one of the electrodes being movable toward the other and the pair connected to the terminal ends of the secondary winding, magnetic means including a coil for moving the movable electrode toward the other, a condenser, and a mercury vapor discharge tube, the primary winding, the coil, the condenser and the discharge tube being connected in series.

2. A welding device comprising a transformer having primary and secondary windings, two opposed electrodes adapted to receive work pieces therebetween, one of the electrodes being movable toward the other and each connected to the terminal ends of the secondary winding, an armature mounted on the movable electrode, a solenoid coil associated with the armature and adapted to move the armature and movable electrode toward the other electrode, and a source of high frequency current, said coil and primary winding being connected in series to said source of current.

3. A welding device comprising a transformer, having primary and secondary windings, two opposed electrodes adapted to receive work pieces therebetween, one of the electrodes being movable toward the other and each connected to the terminal ends of the secondary winding, an armature mounted on the movable electrode, a solenoid coil for urging the movable electrode toward the other electrode and cooperating with the armature, a source of current, said coil and primary winding being connected in series to said source of current, switching means for controlling the flow of current from said source through said coil and primary, a second solenoid coil adjacent the first mentioned coil for altering the effect of the first solenoid on the armature, and a time relay responsive to the action of the switching means for controlling a flow of current through the second solenoid coil.

4. A welding device comprising a voltage stepdown transformer, a condenser, and means for charging same, a mercury arc discharge tube having two separated mercury pool electrodes and mercury vapor in contact with each of said electrodes, the primary of the transformer, the condenser and the discharge tube being electrically connected in series, means for initiating an ionization of the contents of the tube, welding electrodes connected to the secondary of the transformer and means for lightly applying pressure to the electrodes in the initial discharge of the condenser.

ALFRED VANG.